United States Patent [19]

Tanaka

[11] Patent Number: 5,581,726
[45] Date of Patent: Dec. 3, 1996

[54] CONTROL SYSTEM FOR CONTROLLING CACHE STORAGE UNIT BY USING A NON-VOLATILE MEMORY

[75] Inventor: Keishichiro Tanaka, Kawasaki, Japan

[73] Assignee: Fujitsu Limited, Kawasaki, Japan

[21] Appl. No.: 328,573

[22] Filed: Oct. 24, 1994

Related U.S. Application Data

[63] Continuation of Ser. No. 809,914, Dec. 19, 1991, abandoned.

[30] Foreign Application Priority Data

Dec. 21, 1990 [JP] Japan .................................. 2-405167

[51] Int. Cl.$^6$ .................................................. G06F 12/12
[52] U.S. Cl. .................... 395/461; 395/430; 395/440; 395/444; 395/460; 395/483; 395/486
[58] Field of Search ................................. 395/430, 440, 395/444, 460, 461, 483, 486

[56] References Cited

U.S. PATENT DOCUMENTS

| | | | |
|---|---|---|---|
| 4,916,605 | 4/1990 | Beardsley et al. | 364/200 |
| 4,920,478 | 4/1990 | Furuya et al. | 395/425 |
| 5,170,466 | 12/1992 | Rogan et al. | 395/400 |
| 5,253,351 | 10/1993 | Yamamoto et al. | 395/425 |

OTHER PUBLICATIONS

J. Menon et al., "The IBM 3990 Disk Cache," IEEE—Compcon Spring 1988 Digest Of Papers, Feb. 29–Mar. 4, 1988, San Francisco, CA, pp. 146–151.

Patent Abstracts Of Japan, vol. 13, No. 297 (P–895) 1989 & JP-A-1 076 346 dated Mar. 22, 1989.
IBM Technical Disclosure Bulletin, vol. 32, No. 11, Apr. 1990, Armonk, NY, "Preventing Overflow in a Wraparound Buffer," pp. 81–82.

*Primary Examiner*—Reba I. Elmore
*Attorney, Agent, or Firm*—Staas & Halsey

[57] ABSTRACT

A control system controls a disk unit and a cache storage unit having a cache memory and a nonvolatile memory based on a writing instruction supplied from a host computer. The control system includes a first processing block for writing the updated data in both the cache memory and the nonvolatile memory when an unused area in the nonvolatile memory is not less than a reference area. The updated data which has been written in the nonvolatile memory is written in the disk unit asynchronously with the writing instruction. The control system further includes a second processing block for writing the updated data in both the cache memory and the disk unit when the unused area in the nonvolatile memory is less than the reference area and the nonvolatile memory does not have the data corresponding to the identified track. The control system also includes a third processing block for carrying out the same process as that carried out by the first processing block when the unused area in the nonvolatile memory can be used for storing the data for one track. In addition, the control system includes a fourth processing block for writing the data which has been stored in the nonvolatile memory in the disk unit, and for writing the updated data in both the cache memory and the disk unit when the unused area in the nonvolatile memory cannot be used for storing the data for one track.

7 Claims, 12 Drawing Sheets

CONTROL SYSTEM FOR CONTROLLING CACHE STORAGE UNIT BY USING A NON-VOLATILE MEMORY

This application is a continuation of application Ser. No. 07/809,914, filed Dec. 19, 1991, now abandoned.

BACKGROUND OF THE INVENTION (1) Field of the Invention

The present invention generally relates to a control system for controlling an auxiliary storage unit a cache storage unit and, more particularly, to a control system for controlling an auxiliary storage unit and a cache storage unit having a cache memory and a nonvolatile memory, which system being provided in a data processing system.

(2) Description of Related Art

A data processing system including a host computer, a cache storage unit having a cache memory, and an auxiliary storage unit (for example, a DASD (Direct Access Storage Device such as a disk unit)) has been proposed. In this data processing unit, when the cache memory has the same data as that in the auxiliary storage unit, the host computer reads out the data from the cache memory instead of the data from the auxiliary storage unit. In this case, since the auxiliary storage unit (such as the disk unit), which requires a long access time, is not accessed, the time required for obtaining the data can be decreased.

Alternatively, the data supplied from the host computer is written in the auxiliary storage unit in accordance with a data writing process which is often referred to as a write through process.

Figure 1:
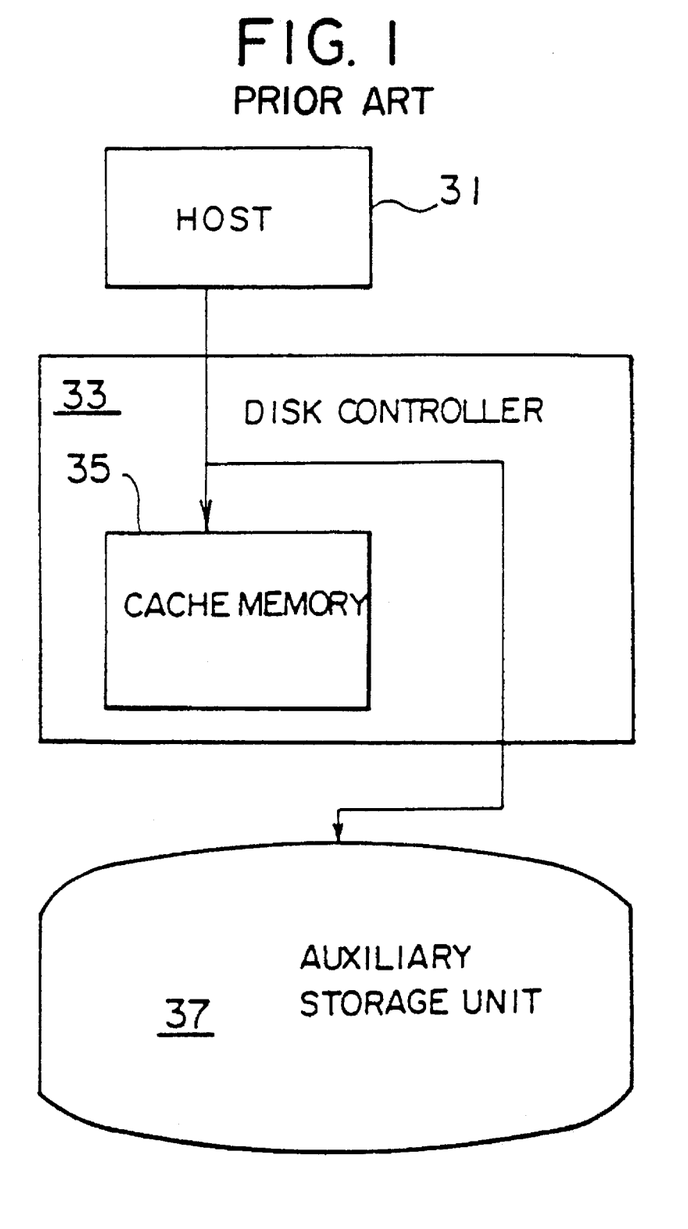
FIG. 1 is a diagram illustrating a control system for controlling a cache storage unit and an auxiliary storage unit in accordance with a write through process.

In the write through process, as shown in FIG. 1, when a host computer 31 supplies a writing instruction along with updated data to a disk controller 33, the disk controller 33 writes the updated data in both a cache memory 35 and an auxiliary storage unit 37 (a disk unit). This write through process has an advantage in that the data stored in the cache memory 35 is always the same as corresponding data stored in the auxiliary storage unit 37. However, as the time required for data writing depends on the access time of the auxiliary storage unit (the disk unit), the cache memory 35 can not be effectively used for the data writing.

Figure 2:
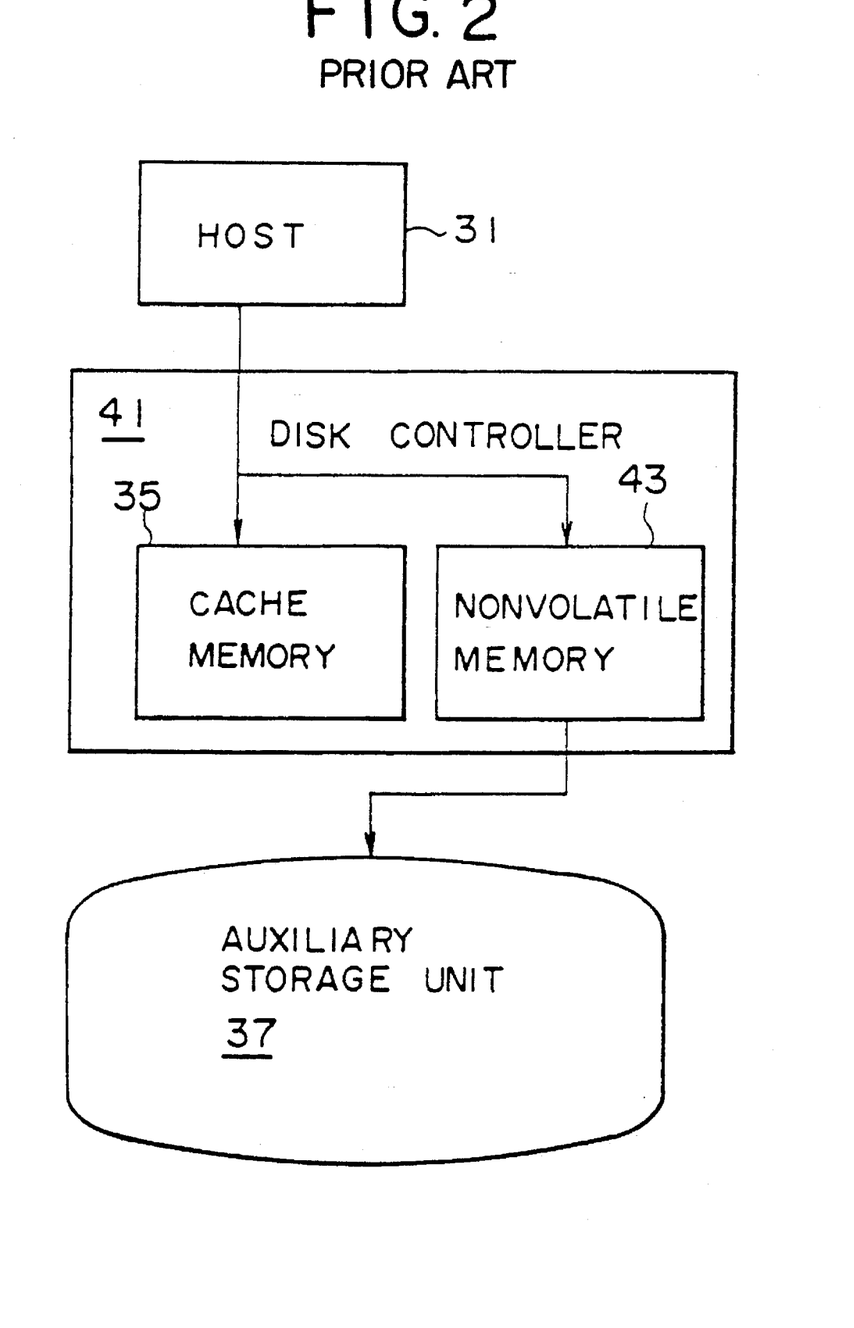
FIG. 2 is a diagram illustrating a control system for controlling a cache storage unit and an auxiliary storage unit in accordance with a fast write process.

To eliminate the above disadvantage of the write through process, a system having a nonvolatile memory has been proposed, as shown in FIG. 2. Referring to FIG. 2, the disk controller 41 includes a cache storage unit formed of the cache memory 35 and a nonvolatile memory 43. The capacity of the nonvolatile memory 43 is less than that of the cache memory 35. This system carries out a data writing process which is often referred to as a fast write process. In the fast write process, when the host computer 31 supplies the writing instruction along with the updated data to the disk controller 41, the disk controller 41 controls the cache storage unit so that the updated data is stored in both the cache memory 35 and the nonvolatile memory 43. After this, the disk controller 41 writes the updated data which has been stored in the nonvolatile memory 43 into the auxiliary storage unit 37 asynchronously with the writing instruction from the host computer 31. A process for writing the data stored in the nonvolatile memory 43 into the auxiliary memory 37 is referred to as a write back process. According to the fast write process, as the updated data is written in the nonvolatile memory 43, instead of the auxiliary storage unit 37, in response to the writing instruction from the host computer 31, the time required for the writing process based on the writing instruction is less than that required in the write through process described above. That is, the writing process can be carried out at a higher speed.

In the system having the nonvolatile memory 43, to effectively use the memories, a track on which data is stored is divided into N blocks, and data for every block can be written in and read out from the cache memory 35 and the nonvolatile memory 43. Thus, when the number of unused blocks in the nonvolatile memory 43 is less than N and the number of blocks corresponding to updated data supplied from the host computer 31 is greater than N, the data cannot be written in the nonvolatile memory 43. In this case, different writing processes are carried out based on whether or not the nonvolatile memory 43 has data on an identified track in the cache memory 35. That is, in a first process, when the nonvolatile memory 43 has no data on the identified track, the write data, corresponding to the identified track and supplied from the host computer 31 is written in the auxiliary storage memory 37 in accordance with the write through process described above. In the second process, to update data in the correct order in the auxiliary storage unit 37, when the nonvolatile memory 43 has the data on the identified track, the write data, corresponding to the identified track, supplied from the host computer 31 is written in the auxiliary storage unit 37 after the data which has been stored in the nonvolatile memory 43 is supplied to the auxiliary storage unit 37 and written in it. The second process described above is often referred to as a write back and write through process.

According to the conventional control system for controlling the cache storage unit including the nonvolatile memory, the write data supplied from the host computer will be always processed in accordance with the fast write process while the nonvolatile memory is in a state where the number of unused blocks in the nonvolatile memory is greater than the number of blocks corresponding to the data supplied from the host computer. Thus, in a state where the number of unused blocks in the nonvolatile memory 43 is small, the probability that the write data supplied from the host computer is processed in accordance with the write back and write through process increases. In the write back and write through process, the auxiliary storage unit is accessed two times, so that the time required for the write back and write through process is at least twice that required for the write through process.

SUMMARY OF THE INVENTION

Accordingly, a general object of the present invention is to provide a novel and useful control system for controlling a cache storage unit having a nonvolatile memory in which the disadvantages of the aforementioned prior art are eliminated.

A more specific object of the present invention is to provide a control system for controlling a cache storage unit having a nonvolatile memory by which a probability that the write back and write through process will be carried out, in a state where the number of unused blocks in the nonvolatile memory is small, can be decreased.

The above objects of the present invention are achieved by a control system for controlling an auxiliary storage unit and a cache storage unit having cache memory and nonvolatile memory based on a writing instruction, supplied along with updated data from an external unit, for writing the updated data in an identified storage region of the auxiliary storage unit. The control system includes a first determination for determining whether or not an unused area in the nonvolatile memory is less than a reference area, the unused area being an area having no data. Also included is a first processing unit for carrying out a first process when the first determination means determines that the unused area in the nonvolatile memory is not less than the reference area. The first process includes a step for writing the updated data in both the cache memory and the nonvolatile memory means. The updated data which has been written in the nonvolatile memory is written in the identified storage region of the auxiliary storage unit asynchronously with the writing instruction. There is a second determination unit, coupled to the first determination unit, for determining whether or not the nonvolatile memory has data corresponding to the identified storage region when the first determination determines that the unused area in the nonvolatile memory is less than the reference area. There is a second processing unit for carrying out a second process when the second determination unit determines that the nonvolatile memory does not have the data corresponding to the identified storage region. The second process includes a step for writing the updated data in both the cache memory means and the identified region of the auxiliary storage unit. Also included is a third determination unit, coupled to the second determination unit, for determining whether or not the unused area in the nonvolatile memory can be used for storing data for one storage region of the auxiliary storage unit when the second determination unit determines that the nonvolatile memory has the data corresponding to the identified storage region. There is a third processing unit for carrying out the first process when the third determination unit determines that the unused area in the nonvolatile memory can used for storing the data for one storage region of the auxiliary storage unit. There is also a fourth process means for carrying out a third process when the third determination unit determines that the unused area in the nonvolatile memory cannot be used for storing the data for one storage region of the auxiliary storage unit. The third process includes a first step for writing the data which has been stored in the nonvolatile memory into the identified storage region of the auxiliary storage unit, and a second step for writing the updated data into both the cache memory means and the identified storage region of the auxiliary storage unit after the first step.

According to the present invention, in a case where the unused area in the nonvolatile memory is less than the reference area, the area in the nonvolatile memory is prevented from being used for a new identified track, and the unused area in the nonvolatile memory is preferentially used for storing data corresponding to the identified track whose data has been stored in the cache memory. Thus, the probability that third process (the write back and write through process) in which the auxiliary storage unit is accessed twice is carried out can be decreased.

Additional objects, features and advantages of the present invention are apparent from the following detailed description when read in conjunction with the accompanying drawings.

DESCRIPTION OF THE PREFERRED EMBODIMENTS

A description will now be given of the principle of a process carried out by a control system according to an embodiment of the present invention, with reference to FIG. 3.

Figure 3:
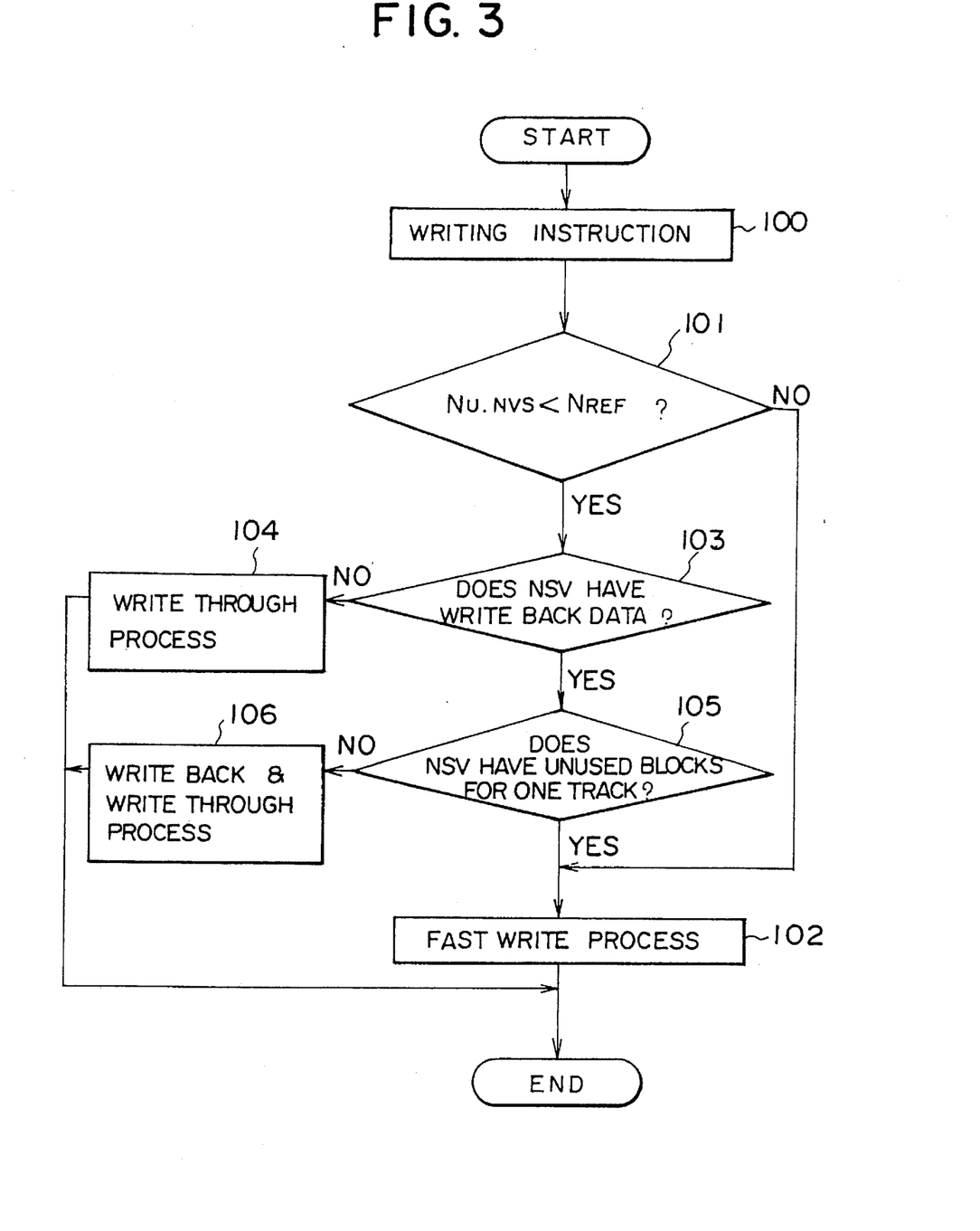
FIG. 3 is a flow chart illustrating the principle of a process carried out in a control system according to an embodiment of the present invention.

The process shown in FIG. 3 is carried out, for example, by the cache controller 41 shown in FIG. 2. Referring to FIG. 3, step 100 receives a writing instruction along with write data supplied from the host computer 31. Then step 101 determines whether or not the number ($N_{UNVS}$) of unused blocks in the nonvolatile memory 43 is less than a predetermined reference value ($N_{REF}$). When step 101 determines that the number ($N_{UNVS}$) of the unused block in the nonvolatile memory 43 is not less than the reference value ($N_{REF}$), step 102 controls the cache storage unit in accordance with the fast write process. That is, the write data supplied from the host computer 31 is stored in the nonvolatile memory 43 in a state where the cache controller 41 is not connected to the auxiliary storage unit 37. After this the data stored in the nonvolatile memory 43 is written in the auxiliary storage unit 37 asynchronously with the writing instruction from the host computer 31. When step 101 determines that the number ($N_{UNVS}$) of unused blocks in the nonvolatile memory 43 is less than the reference value $N_{REF}$, step 103 determines whether or not the nonvolatile memory 43 has data on a track which has been identified in the cache memory 35. When the nonvolatile memory 43 has no data on the identified track, step 104 directly writes the write data in both the auxiliary storage unit 37 and the cache memory 35 in accordance with the write through process so as to prevent the number of used blocks in the nonvolatile memory 43 from increasing. In this state, when the data stored in the nonvolatile memory 43 is written in the auxiliary storage unit 37 in accordance with the write back process and asynchronously with the writing instruction, the number of unused blocks in the nonvolatile memory 43 increases. On the other hand, when step 103 determines that the nonvolatile memory 43 has the data on the identified track, step 105 determines whether or not data for one track which is the maximum amount of data for one writing operation can be written in the nonvolatile memory 43. When step 105 determines that the data for one track can be stored in the nonvolatile memory 43, step 102 controls the cache storage unit in accordance with the fast write process. When step 105 determines that the data for one track cannot be stored in the nonvolatile memory 43, step 106 controls the cache storage unit and the auxiliary storage unit 37 in accordance with the write back and write through process. That is, after the data which has been stored in the nonvolatile memory 43 is written in the auxiliary storage unit 37 in accordance with the write back process, the write data is written in the auxiliary storage unit 37 in accordance with the write through process.

According to the above writing processes, when the number of unused blocks in the nonvolatile memory 43 is small (less than the reference number), the number of blocks corresponding to data on newly identified tracks is prevented from increasing, and the unused blocks in the nonvolatile memory 43 are preferentially used for storing data corresponding to the identified track in the cache memory 35. That is, since the amount of data on the newly identified track in the nonvolatile memory 43 is not increased, the probability that the data stored in the nonvolatile memory 43 will be accessed in the writing process is decreased. Thus, the probability that the write back and write through process in which the auxiliary storage unit is accessed twice will be carried out is also decreased.

A description will now be given of an embodiment of the present invention with reference to FIGS. 4 through 7E.

Figure 4:
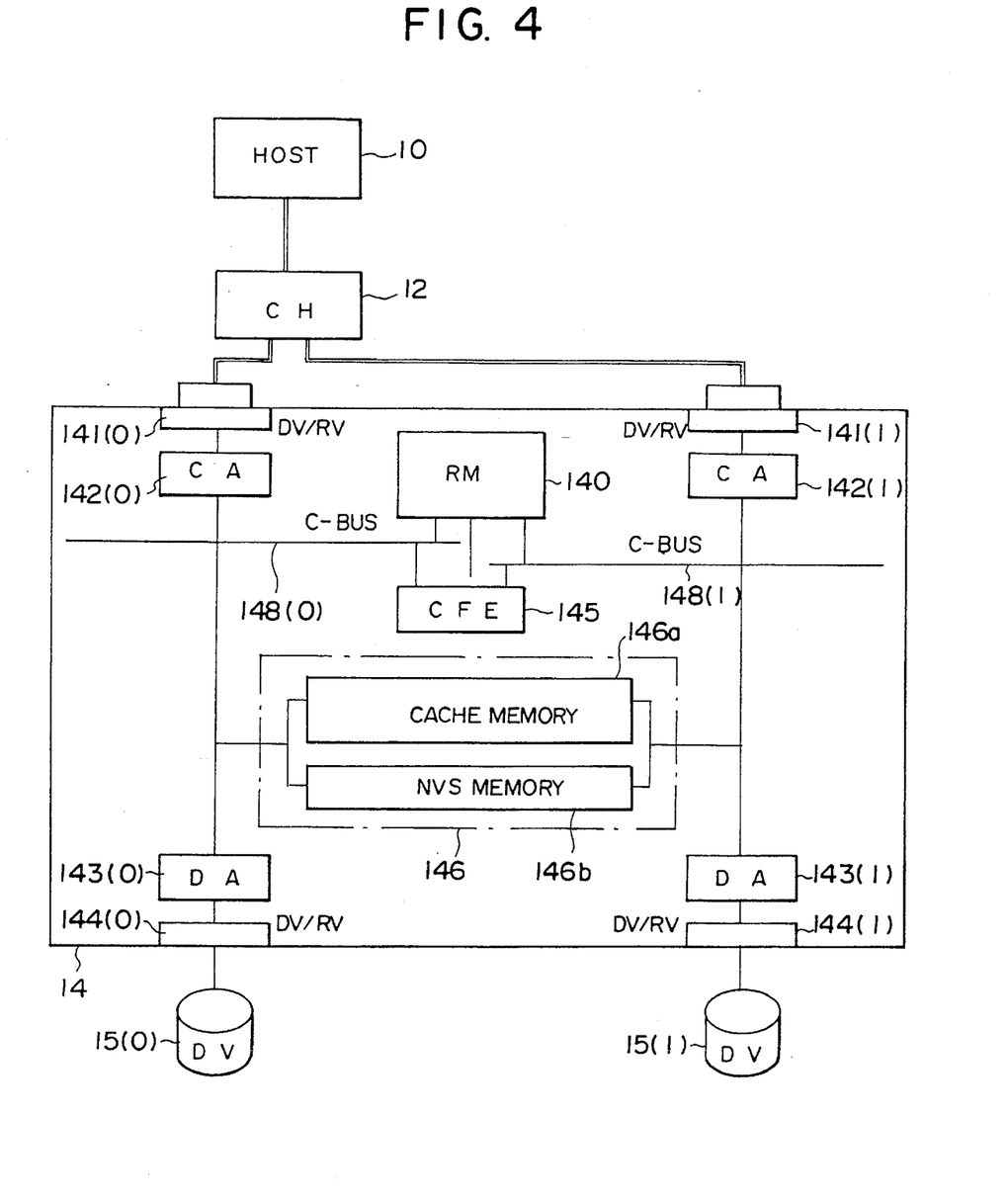
FIG. 4 is a block diagram illustrating a control system according to the embodiment of the present invention.

Referring to FIG. 4, which shows a data processing system including a control system according to an embodiment of the present invention, the data processing system includes a host computer 10, a channel 12, a file controller unit 14, a first disk unit 15(0) and a second disk unit 15(1). The file controller unit 14 controls the first and second disk units 15(0) and 15(1) in accordance with instructions supplied from the host computer 10 via the channel 12. The file controller unit 14 includes a resource manager unit 140, a cache function engine unit 145, a cache storage unit 146, a first input/output system and a second input/output system. The first and second input/output systems respectively have driver/receivers 141(0) and 141(1) (DV/RV) coupled to the channel 12, channel adapters 142(0) and 142(1) (CA), device adapters 143(0) and 143(1) (DA), and a driver/receiver 144(0) (DV/RV) coupled to the first disk unit 15(0) and a driver/receiver 144(1) (DV/RV) coupled to the second disk unit 15(1). The first input/output system is coupled to the resource manager unit 140, the cache function engine unit 145 and the cache storage unit 146 by a c-bus 148(0). The second input/output system is also coupled to the resource manager unit 140, the cache function engine unit 145 and the cache storage unit 146 by a c-bus 148(1). The resource manager unit 140 controls all of the parts of the file controller unit 14. The cache function engine unit 145 carries out processes regarding the controlling of the cache storage unit 146. The cache storage unit 146 has a cache memory 146a and a nonvolatile memory 146b.

Figure 5A:
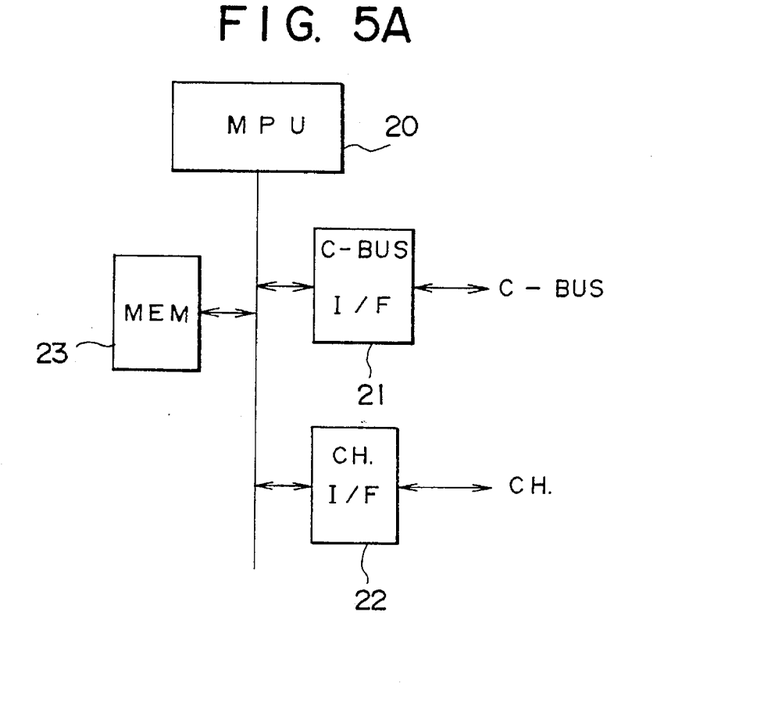
FIG. 5A is a block diagram illustrating a structure of each channel adapter (CA) shown in FIG. 4.

Each of the channel adapters 142(0) and 142(1) is formed, for example, as shown in FIG. 5A. Referring to FIG. 5A, each of the channel adapters has a micro-processing unit 20 (MPU), a bus interface logic unit 21, a channel interface logic unit 22 and a memory 23 which are connected to each other by a bus. The bus interface logic unit 21 is coupled to the c-bus 148(0) or 148(1). The channel interface logic unit 22 is coupled to the channel 12. Various control programs executed by the MPU 20 are stored in the memory 23.

Figure 5B:
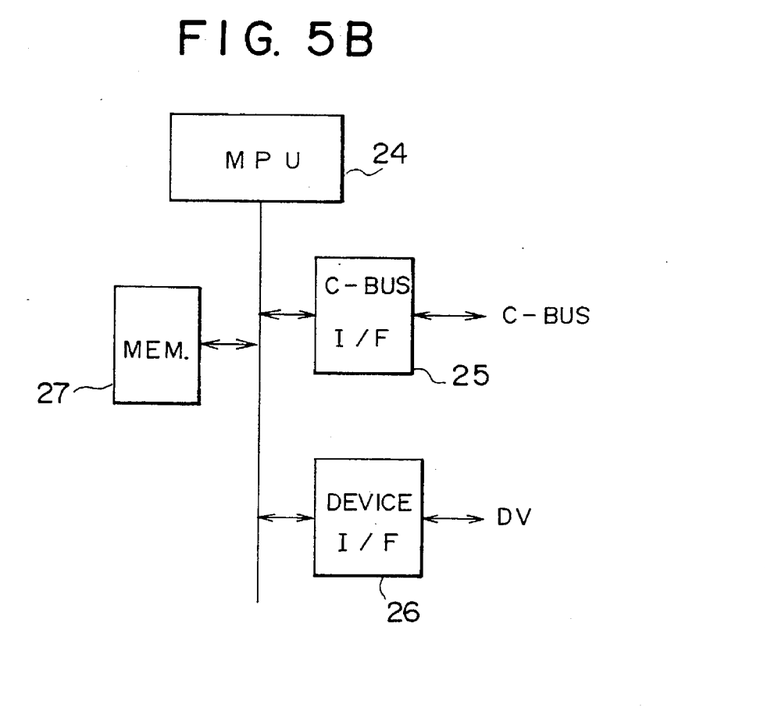
FIG. 5B is a block diagram illustrating a structure of each device adapter (DA) shown in FIG. 4.

Each of the device adapters 143(0) and 143(1) is formed, for example, as shown in FIG. 5B. Referring to FIG. 5B, each of the device adapters has a micro-processing unit 24 (MPU), a bus interface logic unit 25, a device interface logic unit 26 and a memory 27 which are connected to each other by a bus. The bus interface logic unit 25 is coupled to a corresponding c-bus 148(0) or 148(1). The device interface logic unit 26 is coupled to a corresponding disk unit 15(0) or 15(1). Various control programs executed by the MPU 24 are stored in the memory 27.

Figure 5C:
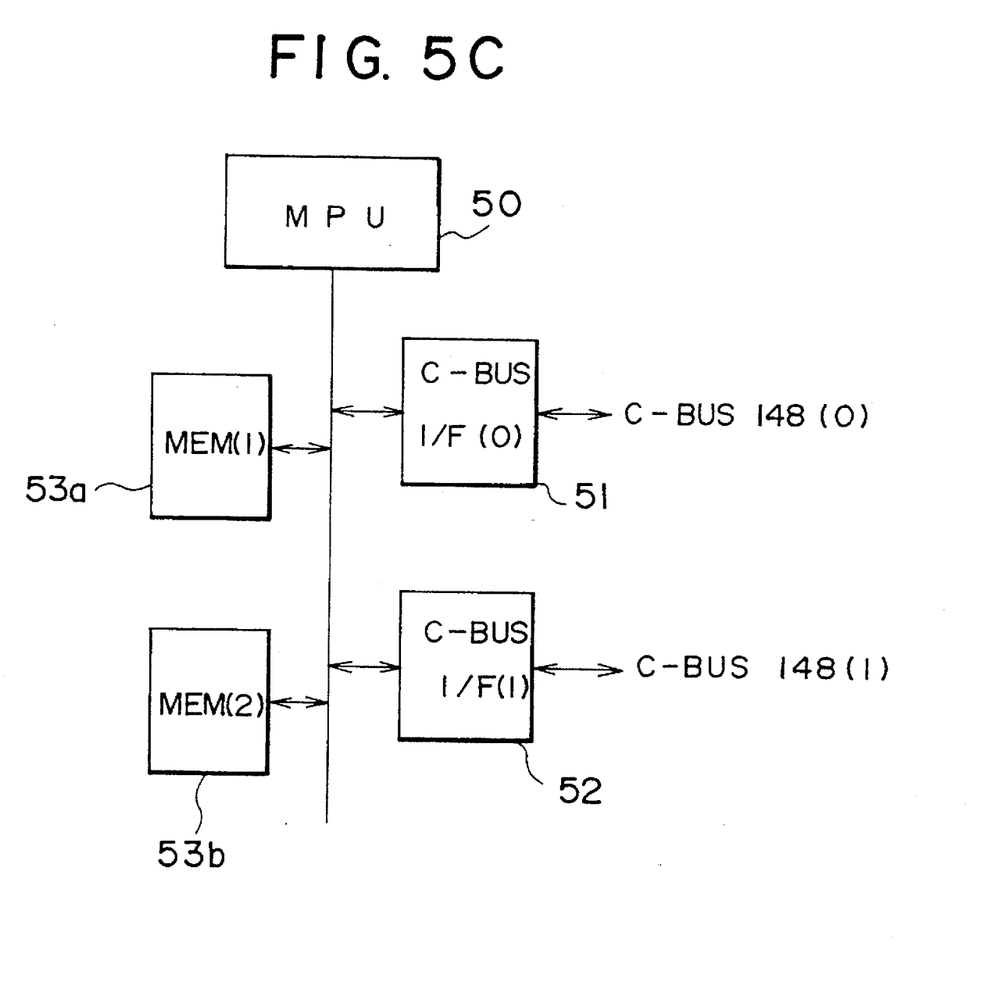
FIG. 5C is a block diagram illustrating a structure of both a resource manager unit (RM) and a cache function engine unit (CFE).

The resource manager unit 140 and the cache function engine unit 145 are respectively formed, for example, as shown in FIG. 5C. Referring to FIG. 5C, a micro-processing unit 50 (MPU) is connected to a first bus interface 51, a second bus interface 52, a first memory 53a and a second memory 53b by a bus. The first bus interface 51 is coupled to the c-bus 148(0), and the second bus interface 52 is coupled to the c-bus 148(1). Various control programs executed by the MPU 50 are stored in the first memory 53a. A task management table used for managing the file controller unit 14 is stored in the second memory 53b of the resource manager unit 140. A cache management table used for controlling the cache storage unit 146 is stored in the second memory 53b of the cache function engine unit 145.

Figure 6:
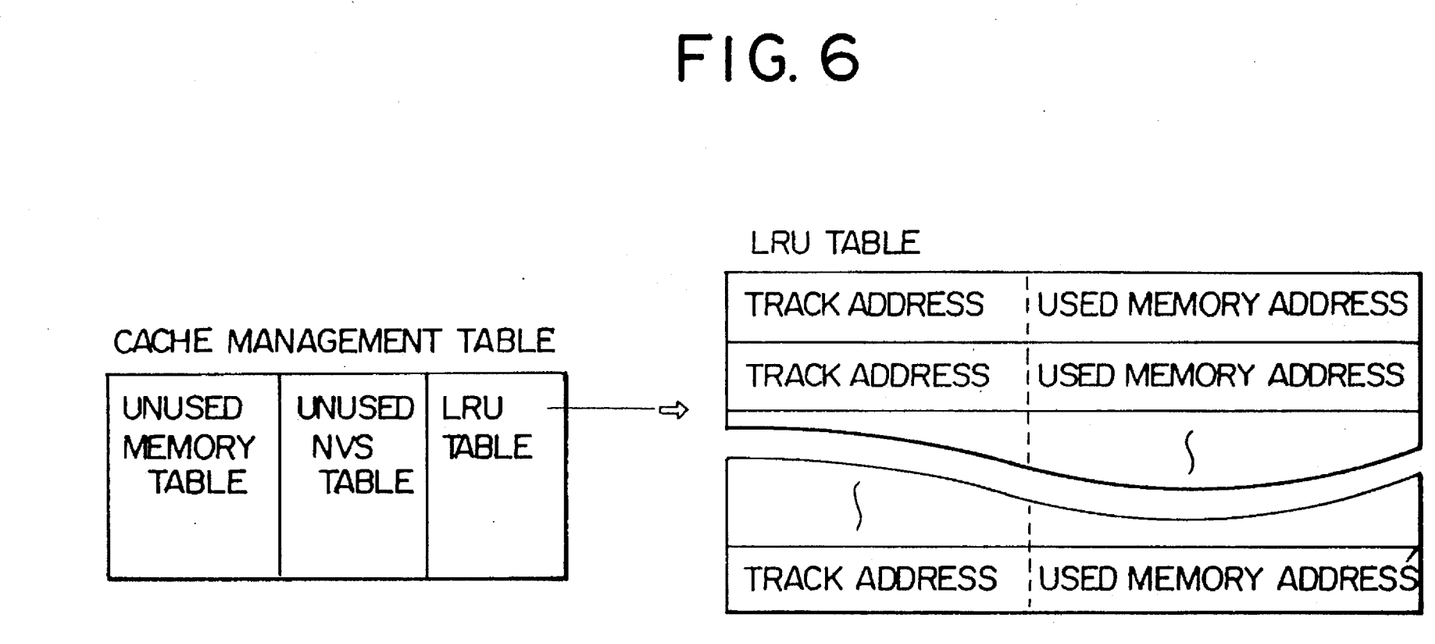
FIG. 6 is a diagram illustrating a structure of a cache control table and an LRU table stored in a memory shown in FIG. 5C.

The cache management table stored in the second memory 53b of the cache function engine unit 145 is formed, for example, as shown in FIG. 6. Referring to FIG. 6, the cache management table has an unused memory table, an unused NSV (Nonvolatile Storage Device) table and an LRU (Least Recently Used) table. The unused memory table indicates unused blocks in the cache memory 146a in which data has not yet been stored. The unused NSV table indicates unused blocks in the nonvolatile memory 146b in which data has not yet been stored. The LRU table indicates relationships between track addresses identifying tracks in the disk units 15(0) and 15(1) and used blocks, which are blocks used for storing the data on the tracks of the disk units 15(0) and 15(1), in the cache memory 146a and the nonvolatile memory 146b. The cache function engine unit 145 controls the cache storage unit 146 with reference to the cache management table, and the cache management table is updated while the cache function engine unit 145 controls the cache storage unit 146.

A description will now be given of operations of the file controller unit 14 in a case where updated data is written in the disk unit 15(0) or 15(1). In this case, the file controller unit 14 operates in accordance with processes shown in FIGS. 7A through 7E.

Figure 7A:
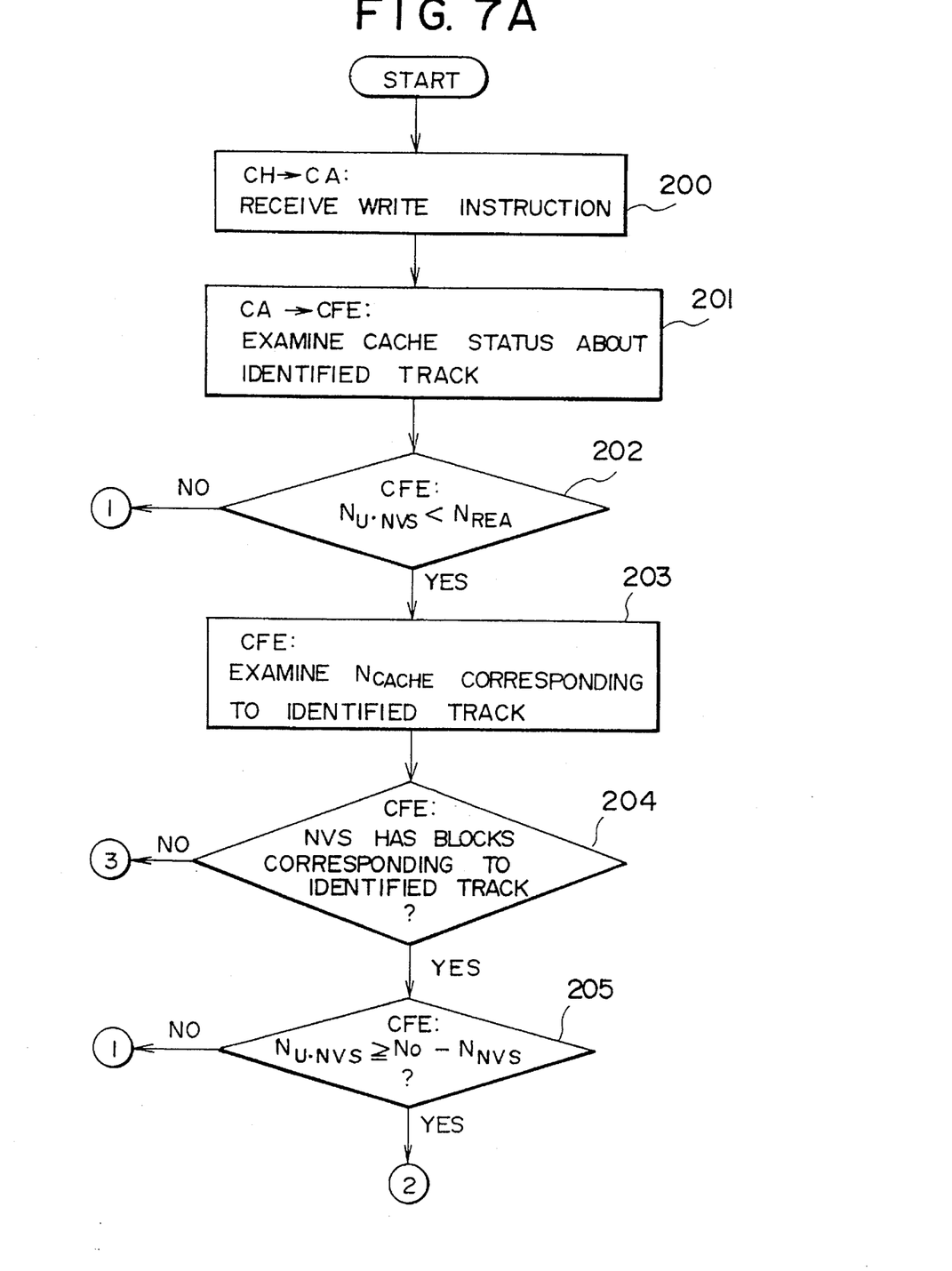
FIGS. 7A through 7E are flow charts illustrating processes for writing data supplied from a host computer in the auxiliary storage unit and the cache storage unit.

When the host computer supplies a write instruction to the channel 12, a process shown in FIG. 7A starts. Hereinafter, it is assumed that the first disk unit 15(0) has been accessed. The channel adapter 142(0) receives the write instruction from the channel 12, in step 200. Write data and a track on which the write data should be stored in the first disk unit 15(0) are specified by the write instruction. When the channel adapter 142(0) receives the write instruction, the channel adapter 142(0) supplies the write instruction to the cache function engine 145. Then the cache function engine 145 examines the cache status concerning the identified track with reference to the cache management table shown in FIG. 6, in step 201. That is, the status of blocks used for the identified track in the cache memory 146a and the nonvolatile memory 146b and the like are examined. In this step, for example, the number $N_{UNVS}$ of unused blocks, which are blocks not used for storing data in nonvolatile memory 146b, is detected. The cache function engine unit 145 determines whether or not the number $N_{UNSV}$ of unused blocks in the nonvolatile memory 146b is less than a predetermined reference value $N_{REF}$, in step 202.

Figure 7B:
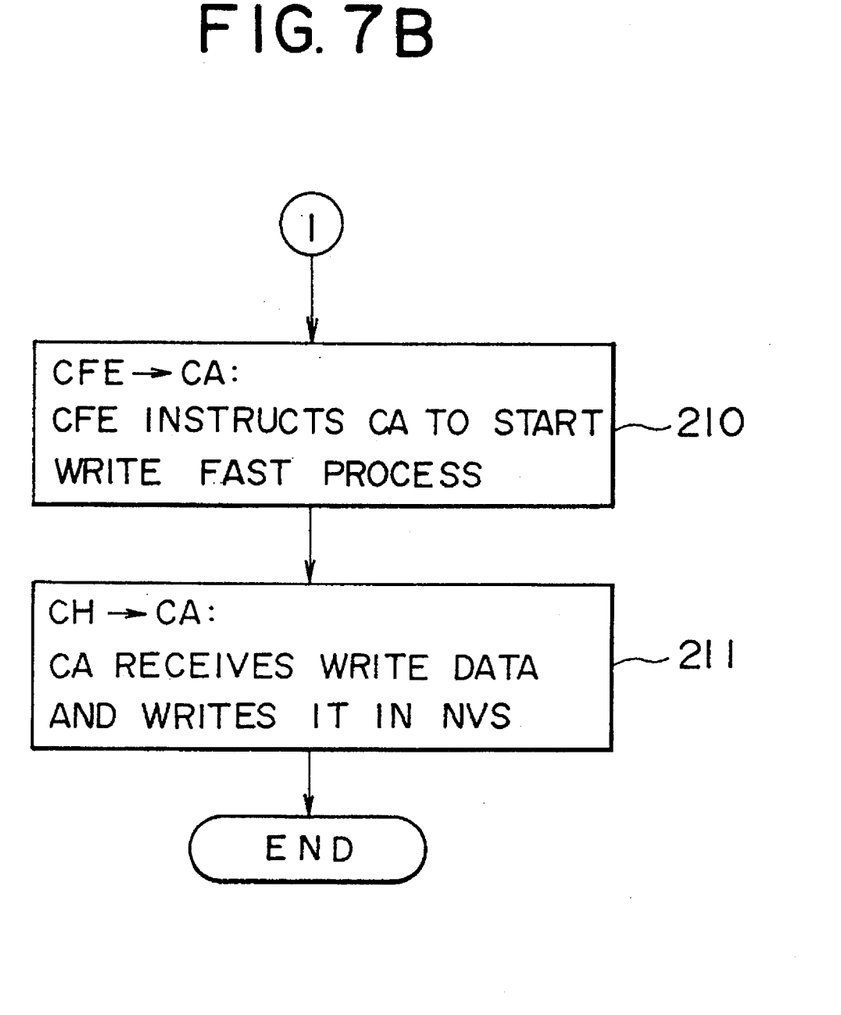

When it is determined that the number $N_{UNSV}$ of unused blocks in the nonvolatile memory 146b is not less than the reference value $N_{REF}$, a process shown in FIG. 7B starts. The process shown in FIG. 7B is referred to as the fast write process. The cache function engine unit 145 instructs the channel adapter 142(0) to start the fast write process, in step 210. Then the channel adapter 142(0) writes the write data supplied from the channel 12 in the nonvolatile memory 146b, in step 211. When the step 211 is completed, the file controller unit 14 finishes the process for writing data. After this the data stored in the nonvolatile memory 146 is written in the first disk unit 15(0), based on control by the resource manager 140 and the cache function engine unit 145, asynchronously with the write instruction from the host computer 10.

Figure 7C:
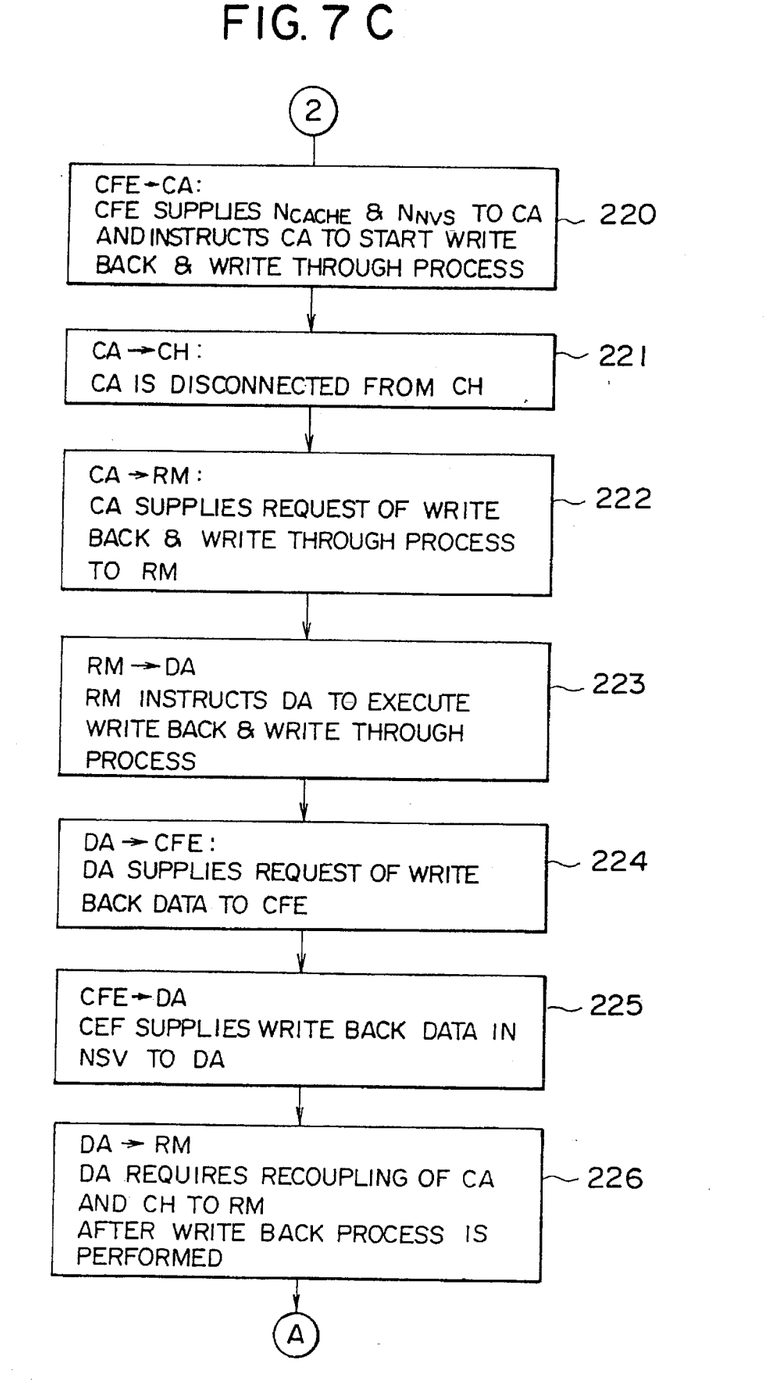
Figure 7D:
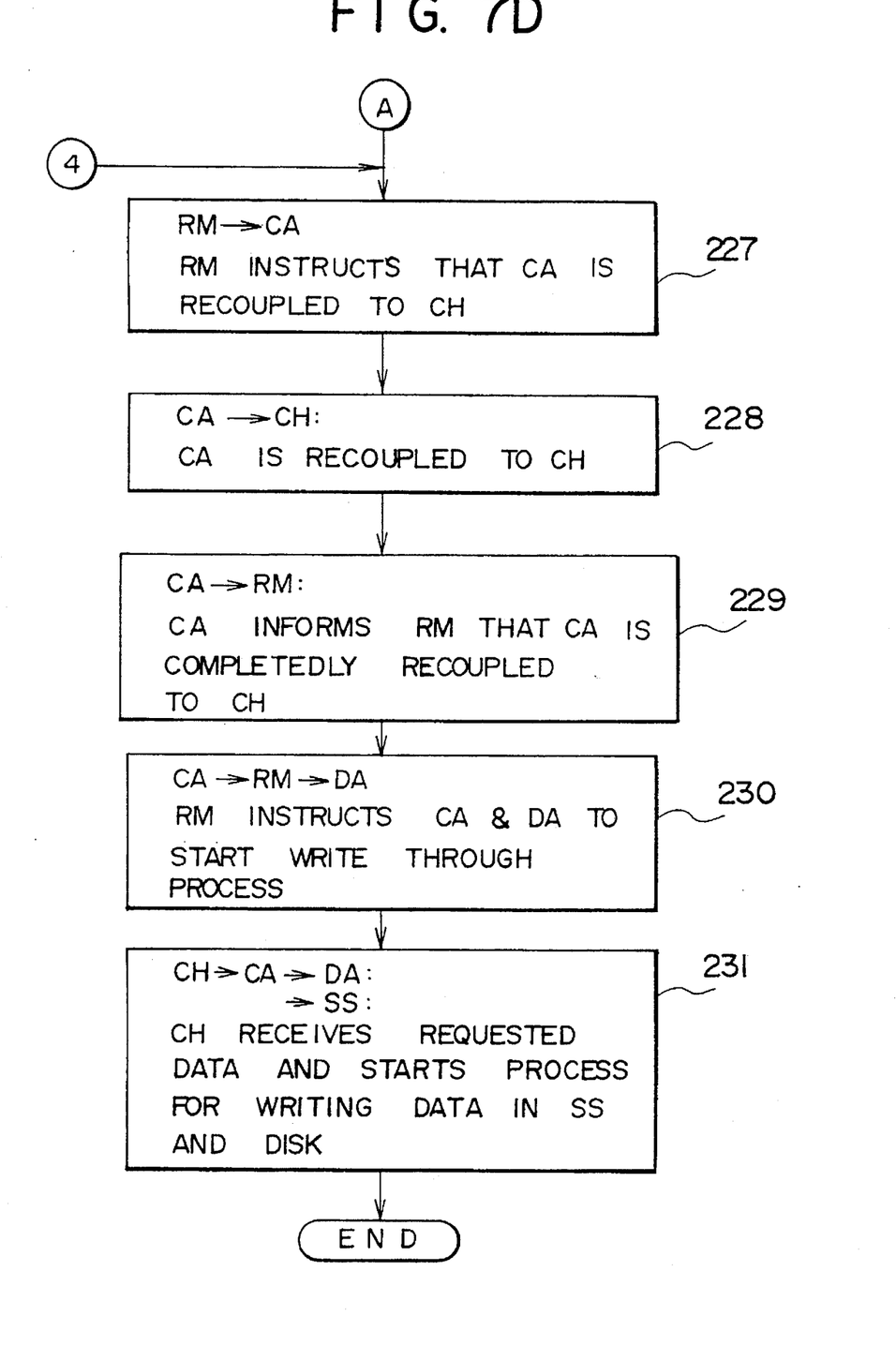
Figure 7E:
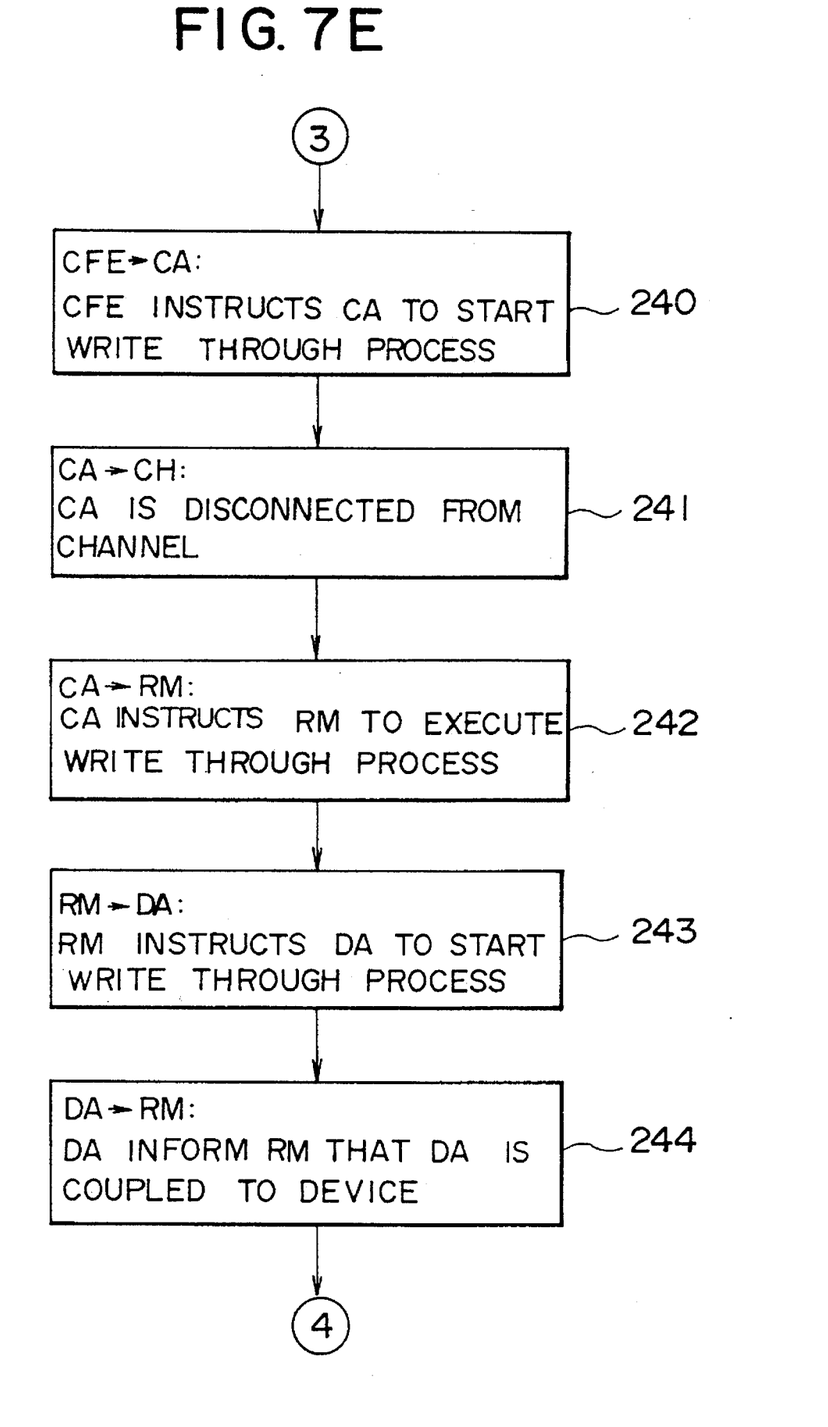

On the other hand, when the function engine unit 145 determines, step 202, that the number $N_{UNSV}$ of unused blocks in the nonvolatile memory 146b is less than the reference value $N_{REF}$, the cache function engine 145 examines the number $N_{CACHE}$ of blocks used for the identified track in the cache memory 146a with reference to the cache management table, in step 203. Then, in step 204 the cache function engine unit 145 determines whether or not the nonvolatile memory 146b has blocks used for the identified track. When it is determined that the nonvolatile memory 146b has no blocks used for the identified track, a process shown in FIG. 7E and FIG. 7D starts. The process shown in FIG. 7E and FIG. 7D is referred to as the write through process. After step 204, the cache function engine unit 145 instructs the channel adapter 142(0) to start the write through process, in step 240. The channel adapter 142(0) is disconnected from the channel 12, in step 241, and then the channel adapter 142(0) instructs the resource manager unit 140 to execute the write through process, in step 242. Then the resource manager unit 140 instructs the device adapter 143(0) to start the write through process, in step 243. When the device adapter 143(0) is coupled to the first disk unit 15(0), the device adapter 143(0) informs the resource manager unit 140 that the device adapter 143(0) has been coupled to the first disk unit 15(0), in step 244. After step 244, the step proceeds to step 227 shown in FIG. 7D. When the device adapter 143(0) is coupled to the first disk unit 15(0) as described above, the resource manager 140 instructs the channel adapter 142(0) to be recoupled to the channel 12, in step 227. The channel adapter 142(0) is recoupled to the channel 12 based on the instruction from the resource manager unit 140, in step 228. When the channel adapter 142(0) is completely recoupled to the channel 12, the channel adapter 142(0) informs the resource manager unit 140 that the channel adapter 142(0) has been recoupled to the channel, in step 229. Then the resource manager unit 140 instructs both the channel adapter 142(0) and the device adapter 143(0) to start the write through process, in step 230. After this, the channel adapter 142(0) receives the write data supplied from the channel 12 via the driver/receiver 141(0) and writes the write data in the cache memory 146a, in step 231. At this time, the write data is supplied from the channel adapter 142(0) to the device adapter 143(0). Then the device adapter 143(0) writes the write data in the first disk unit 15(0). When step 231 is completed, the file controller unit 14 finishes the process for writing data.

Returning to FIG. 7A, when the cache function engine unit 145 determines that the nonvolatile memory 146b has the blocks used for the identified track, the cache function engine unit 145 determines whether or not the number $N_{UNSV}$ of unused blocks in the nonvolatile memory 146b is equal to or greater than a difference between the number $N_o$ of blocks for one track and the number $N_{NVS}$ of blocks used for the identified track. As the maximum amount of data which can be updated in operation is one track, when the number $N_{UNSV}$ of the unused blocks in the nonvolatile memory 146b is equal to or greater than the difference between the numbers $N_o$ and $N_{NVS}$, the write data supplied from the host computer 10 can be written in the nonvolatile memory 146b by using the unused blocks. That is, when the cache function engine unit 145 determines that the number $N_{UNVS}$ of the unused blocks in the nonvolatile memory 146b is equal to or greater than the difference between the numbers $N_o$ and $N_{NVS}$, the fast write process shown in FIG. 7B is carried out, in the same manner as described above.

On the other hand, when the number $N_{UNSV}$ of unused blocks in the nonvolatile memory 146b is less than the difference between the number $N_o$ of blocks for one track and the number $N_{NSV}$ of the blocks used for the identified track in the nonvolatile memory 146b, a case where all of the write data is not stored in the nonvolatile memory 146b may occur. Thus, when the cache function engine unit 145 determines that the number $N_{UNVS}$ of unused blocks in the nonvolatile memory 146b is less than the difference between the numbers $N_o$ and $N_{NVS}$, the write back and write through processes are carried out. That is, the process shown in FIGS. 7C and 7D starts.

The cache function engine unit 145 supplies data about the number $N_{CACHE}$ of blocks used for the identified track in the cache memory 146a and data about the number $N_{NVS}$ of blocks used for the identified track in the nonvolatile memory 146b to the channel adapter 142(0). Then the cache function engine unit 145 instructs the channel adapter 142(0) to start the write back and write through process, in step 220. Then, in step 221, the channel adapter 142(0) is disconnected from the channel 12. The channel adapter 142(0) supplies request data of the write back and write through process to the resource manager unit 140, in step 222. When the resource manager unit 140 receives the request data, the resource manager unit 140 instructs the device adapter 143(0) to execute the write back and write through process, in step 223. The device adapter 143(0) then supplies a request for obtaining write back data to the cache function engine unit 145, in step 224. The write back data is data which corresponds to the identified track and is stored in the nonvolatile memory 146b. In the response to the above request of the device adapter 143(0), the cache function engine unit 145 reads out the write back data from the nonvolatile memory 146b and supplies it to the device adapter 143(0), in step 225. After this, the device adapter 143(0) writes the write back data on the identified track in the first disk unit 15(0), in step 226. Then the device adapter 143(0) informs the resource manager unit 140 that the channel adapter 142(0) is recoupled to the channel 12.

When the write back data stored in the nonvolatile memory 146b is written on the identified track in the first disk unit 15(0), the process shown in FIG. 7D is performed in the same manner as the write through process described above, so that the write data supplied from the host computer 10 is written in both the cache memory 146b and the first disk unit 15(0).

In the above embodiment of the present invention, the reference value $N_{REF}$ which is compared with the number $N_{UNVS}$ of unused blocks in the nonvolatile memory 146b depends on the probability that accessed data exists in the cache memory 146a (the data hit) obtained in the data processing system and the like.

The present invention is not limited to these embodiments, but various variations and modifications may be made without departing from the scope of the present invention.

What is claimed is:

1. A control system writing updated data in a storage region of an auxiliary storage unit in response to a writing instruction being supplied along with the updated data from an external unit, said storage region identified by the control system and designating an identified storage region of said auxiliary storage unit, said control system comprising:

a cache storage unit comprising:

a cache memory;

a nonvolatile memory coupled to the cache memory; and means, coupled to the cache memory and to the nonvolatile memory, for determining whether an unused area in said nonvolatile memory is less than an area being a minimum area required for storing the updated data and designating a reference area, the unused area being an area having no data, for carrying out a first process if the unused area in said nonvolatile memory is not less than the reference area, said first process including a step for writing the updated data into both said cache memory and said nonvolatile memory, the updated data which has been written into said nonvolatile memory being written into the identified storage region of said auxiliary storage unit asynchronously with the writing instruction, for determining whether said nonvolatile memory has data corresponding to the identified storage region if the unused area in said nonvolatile memory is less than the reference area, for carrying out a second process if said nonvolatile memory does not have the data corresponding to the identified storage region, said second process including a step for writing the updated data into both the cache memory and the identified region of said auxiliary storage unit, for determining whether the unused area in said nonvolatile memory is large enough to store data for one storage region of said auxiliary storage unit if said nonvolatile memory has the data corresponding to the identified storage region, for carrying out said first process if the unused area in said nonvolatile memory can be used for storing the data for one storage region of said auxiliary storage unit, and for carrying out a third process if the unused area in said nonvolatile memory cannot be used for storing the data for one storage region of said auxiliary storage unit, said third process includes a first step for writing the data corresponding to the identified storage region and which has been stored in said nonvolatile memory into the identified storage region of said auxiliary storage unit, and a second step for writing the updated data into both the said cache memory and the identified storage region of said auxiliary storage unit after the first step.

2. A control system as claimed in claim 1, wherein said auxiliary storage unit comprises a disk unit.

3. A control system as claimed in claim 2, wherein said storage region of said auxiliary storage unit is a track of said disk unit.

4. A control system as claimed in claim 3, wherein said track comprises a plurality of blocks, and each of the plurality of blocks comprising data which is written in and read out from said auxiliary storage unit and said cache storage unit.

5. A control system as claimed in claim 4, wherein said first determination means comprises means for determining whether a number of unused blocks in said nonvolatile memory is less than a predetermined reference value.

6. A data processing system, comprising:

a host computer transmitting write blocks comprising updated data;

a cache memory connected to said host computer;

a nonvolatile memory connected to said host computer in parallel with said cache memory;

an auxiliary storage unit connected to said host computer, said cache memory, and said nonvolatile memory; and a resource manager controlling writing of the write blocks into said cache memory, said nonvolatile memory, and said auxiliary storage unit by:

writing into said nonvolatile memory if a number of unused blocks in said nonvolatile memory is not less than a reference value, or the number of unused blocks in said nonvolatile memory is less than the reference value and the nonvolatile memory has blocks corresponding to write-back blocks and the number of unused blocks in the nonvolatile memory is equal to or greater than the write blocks; or writing into said cache memory if the number of unused blocks in the nonvolatile memory is less than the reference value and said nonvolatile memory has no blocks corresponding to the write-back blocks, or said nonvolatile memory has the number of unused blocks less then the write blocks.

7. A data processing system, comprising:

a host computer supplying a write instruction specifying write blocks;

a channel connected to said host computer and receiving the write instruction;

disk units; and a file controller connected to said channel and to said disk units controlling access by said channel to said disk units, and controlling the disk units, said file controller comprising:

an input/output system connecting said channel to said disk units;

a cache storage unit connected to said input/output system, said cache storage unit comprising:

a nonvolatile memory coupled to said channel and to said input/output system;

a cache memory connected in parallel with the nonvolatile memory and coupled to said channel and to said input/output system;

a cache management table containing a status of blocks used for the write blocks in said cache memory and in said nonvolatile memory, said cache management table comprising:

an unused memory cable indicating unused blocks in said cache memory in which data has not yet been stored, an unused nonvolatile storage device table indicating unused blocks in said nonvolatile memory in which data has not yet been stored, and a least recently used table indicating used blocks in said disk units, used blocks being blocks in said disk units, in said cache memory, and in said nonvolatile memory used for storing write blocks;

a resource manager connected to said cache storage unit and controlling said file controller; and a cache function engine coupled to said resource manager and said cache storage unit, and controlling writing of the write blocks by said cache storage unit responsive to the status of the blocks in said nonvolatile memory and based on said cache management table, said cache function engine comprising:

a first memory storing control programs, the control programs comprising storage control programs;

a second memory storing said cache management table controlling said cache storage unit; and a microprocessing unit connected to said first and second memories and executing the storage control programs stored in said first memory.

* * * * *

UNITED STATES PATENT AND TRADEMARK OFFICE
CERTIFICATE OF CORRECTION

PATENT NO. : 5,581,726
DATED : December 3, 1996
INVENTOR(S) : Keishichiro TANAKA It is certified that error appears in the above-indentified patent and that said Letters Patent is hereby corrected as shown below:

Col. 1, line 12, after "unit" insert --,--.

Col. 2, line 57, delete "a" (second occurrence) and insert --the--.

Col. 3, line 8, after "memory" (second occurrence) insert --.--;

line 9, delete "means";

line 22, delete "means"; and line 43, delete "means".

Col. 7, line 20, after "204" insert --,--.

Signed and Sealed this

Twenty-fourth Day of June, 1997

Attest:

BRUCE LEHMAN

*Attesting Officer*     *Commissioner of Patents and Trademarks*